United States Patent [19]

Hokao

[11] Patent Number: 4,899,872

[45] Date of Patent: Feb. 13, 1990

[54] ANTI-WEAVING CONVEYOR BELT

[75] Inventor: Naomi Hokao, Yokohama, Japan

[73] Assignee: Honda Sangyo Co., Ltd., Yokohama, Japan

[21] Appl. No.: 314,107

[22] Filed: Feb. 23, 1989

[30] Foreign Application Priority Data

Mar. 24, 1988 [JP] Japan .............................. 63-38719[U]
Jul. 27, 1988 [JP] Japan .............................. 63-99586[U]

[51] Int. Cl.$^4$ ............................................ B65G 15/38
[52] U.S. Cl. .................................... 198/840; 198/846; 198/957
[58] Field of Search ............... 198/840, 841, 846, 847, 198/957

[56] References Cited

U.S. PATENT DOCUMENTS

| | | | |
|---|---|---|---|
| 2,870,490 | 1/1959 | Freelander | 198/844 X |
| 3,310,161 | 3/1967 | Kraft, Jr. | 198/840 X |
| 3,327,839 | 6/1967 | Sigety et al. | 198/840 X |
| 3,736,805 | 6/1973 | Dent | 198/847 X |

FOREIGN PATENT DOCUMENTS

| | | | |
|---|---|---|---|
| 1230560 | 9/1960 | France | 198/840 |
| 0008372 | 1/1979 | Japan | 198/840 |

Primary Examiner—Robert J. Spar
Assistant Examiner—Lyle Kimms
Attorney, Agent, or Firm—Cushman, Darby & Cushman

[57] ABSTRACT

Disclosed is an anti-weaving conveyor belt comprising a belt body which is composed of a heat-resistant, fluoroplastic-impregnated sheet and at least one guide member fixed to the back of the belt body in its longitudinal direction, the guide member comprising a number of cords twisted together to form a round or square elongation, each cord comprising a number of heat-resistant, fluoroplastic-impregnated fibers twisted together. The round or square elongation is joined to the back of the belt body by stitches of heat-resistant, fluoroplastic-impregnated strands. Thanks to the sewing of the guide member to the belt body, an anti-weaving conveyor belt can be made of a material of good releasability even if the material has no good bonding properties to permit the guide member to be fixed to the belt body by an adhesive. The belt conveyor can be used in an atmosphere at an elevated temperature.

6 Claims, 7 Drawing Sheets

ANTI-WEAVING CONVEYOR BELT

BACKGROUND OF THE INVENTION

1. Field of the Invention

The present invention relates to an anti-weaving conveyor belt, and more particularly to an anti-weaving conveyor belt having at least one longitudinal guide member fixed to the back of the belt body to prevent the belt body from moving along in a zigzag course.

2. Description of the Prior Art

As is well known, a number of conveyor belts are used in factories or warehouses. These conveyor belts are used in transporting things from one place to another. Also, they are used in bringing and putting things such as works exactly at a given position. In this connection there has been a strong demand for preventing the belt from moving along in a zigzag course, thereby assuring that the belt moves straight. Some anti-weaving conveyor belts have been proposed and actually used. One example of such conventional anti-weaving conveyor belts uses a belt with perforations made at regular intervals along its opposite longitudinal edges, and main or auxiliary rolls having teeth to sequentially catch the perforations of the belt. No matter what material the belt may be made of, necessary perforations can be easily made. The perforations of the belt, however, are liable to be deformed or broken when the belt is subjected, for instance to strong vibration while being operated. Therefore, the linear movement of the conveyor belt cannot be assured for an extended period.

Another conventional anti-weaving conveyor belt uses a belt having guide strips along its opposite longitudinal edges, and main or auxiliary rolls each having a circumferential groove to allow each guide strip to fit in. The guide strips are fixed to the opposite longitudinal edges of the belt by using an adhesive. Therefore, the belt and the guide strips must be made of a material which is appropriate for sticking fast, such as rubber or polyurethane. A material which has a good releasability or mold release characteristic, cannot be used if it is not appropriate for sticking fast. Fluoroplastic belt and guide strips are made by impregnating heat resistant material molds with a fluoroplastic and then calcinating the same, and they are appropriate for being used in an atmosphere of elevated temperature. But, the fluoroplastic-impregnated guide strips can be hardly fixed to the fluoroplastic-impregnated belt by an adhesive. This makes it difficult to provide a conveyor belt which can be used in an atmosphere at an elevated temperature.

The guide strips are made by impregnating rubber or plastic mold with a fluoroplastic, and they will expand or contract evenly when subjected to external force. When the guide strip fits in the groove of the roll at each turning end, however, the part of the guide strip which is near the bottom of the groove of the roll will be curved more largely than the part of the guide strip which is remote from the bottom of the groove of the roll, and as a result, the rubber or plastic strip will be distorted in the roll groove to the extent that the belt cannot smoothly move.

SUMMARY OF THE INVENTION

In view of the above one object of the present invention is to provide an anti-weaving conveyor belt which can be used in a high-temperature atmosphere such as an electric furnace.

Another object of the present invention is to provide an anti-weaving conveyor belt which is assured of smooth running in a straight course.

To attain these objects an anti-weaving conveyor belt comprising a belt body which is composed of a heat-resistant, fluoroplastic-impregnated sheet and a guide member which is fixed to the back of the belt body in its longitudinal direction, is improved according to the present invention in that said guide member comprises a number of cords twisted together to form a round or square elongation, each cord comprising a number of heat-resistant, fluoroplastic-impregnated and calcinated fibers twisted together, said round or square elongation being joined to the back of said belt body by stitches of heat-resistant, fluoroplastic-impregnated and calcinated strands. The round or square elongation may be hot-pressed and welded. Thus, the guide elongation is tentatively held to the back of the belt body, and then joined to the back of the belt body by stitches of heat-resistant, fluoroplastic-impregnated and calcinated strands.

According to one aspect of the present invention the belt body has upper band and lower strips melted and attached as reinforcement to the back of the upper band along its opposite longitudinal edges, said round or square elongation being joined to each of said lower strips by stitches of heat-resistant, fluoroplastic-impregnated strands, thereby concealing the stitches below said upper band. The lower strips may be parts of the longitudinal edges of the upper band folded on the back of the upper band.

According to still another aspect of the present invention the belt body has lower band and upper strips melted and attached as reinforcement to the upper surface of the lower band along its opposite longitudinal edges. A round or square elongation is joined to each opposite edge of the lower band by stitches of heat-resistant, fluoroplastic-impregnated strands, thereby concealing the stitches below the upper strips. The upper strips may be parts of the longitudinal edges of the lower band folded on the upper surface of the lower band.

An anti-weaving conveyor belt according to the present invention uses parts and stretches strands all made of a heat-resistant material impregnated with a fluoroplastic, and therefore it can be used on a high-temperature atmosphere. The belt sheet and the guide strips are made of a material which has a good releasability or mold release characteristic, and they are joined by stretching, thus assuring of the separation-free integration.

As a distinctive feature a guide member is composed of a number of cords twisted together to form a round or square elongation, each cord comprising a number of heat-resistant, fluoroplastic-impregnated fibers twisted together. When the guide member fits in the groove of each end roll to bend along the circumference of the roll, the guide member is quite free of uneven stress which would twist the guide member while the belt is turning around each end roll, preventing the smooth running of the belt. Each cord weaves inward and outward within the whole length of the round or square elongation, and therefore, a part of the cord comes close to the groove bottom of the roll, and another part goes remote from the groove bottom of the roll. The stress caused in the part of the cord which is close to the groove bottom is stronger than the stress caused in the part of the cord which is remote from the groove bottom. However, it should be noted that each and every cord has the same resultant stress and that the guide member comprising many cords twisted together will be evenly stressed when the guide member is bent along the circumference of the roll. Thus, the guide member is guaranteed free of local stress or distortion, and therefore the smooth guide of the belt is assured.

Other objects and advantages of the present invention will be understood from the following description of preferred embodiments, which are shown in accompanying drawings:

FIGS. 1 to 5 show an anti-weaving conveyor belt according to a first embodiment of the present invention.

FIGS. 6 to 8 show an anti-weaving conveyor belt according to a second embodiment of the present invention.

FIGS. 9 and 10 show an anti-weaving conveyor belt according to a third embodiment of the present invention.

FIGS. 11 and 12 show an anti-weaving conveyor belt according to a fourth embodiment of the present invention.

FIGS. 13 and 14 show an anti-weaving conveyor belt according to a fifth embodiment of the present invention.

FIGS. 1, 2A, 2B, 3, 4 and 5 show an anti-weaving conveyor belt according to the first embodiment of the present invention as comprising a belt body 1 which is composed of a heat-resistant sheet 2 impregnated with a fluoroplastic material 3 as indicated by arrow P and shown at an enlarged scale, and a guide member 4 to be fixed to the belt body 1 in its longitudinal direction. Examples of the heat-resistant sheet material are glass fiber, aramid fiber etc., and examples of the fluoroplastic material 3 are polytetrafluoroethylene (PTFE), polychlorotrifluoroethylene (PCTFE) etc.

Figure 2A:
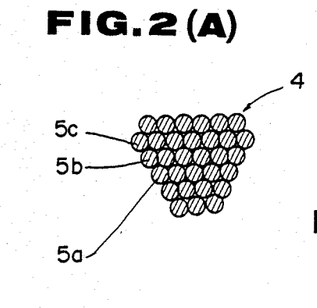
FIG. 2A is an end view of the guide member.
Figure 2B:
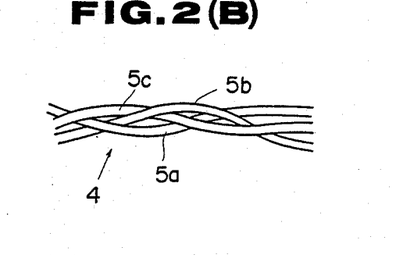
FIG. 2B is an enlarged side view of a part of the guide member to show the twisted form of cords in an exaggerated manner.

The elongated guide member 4 is made of the same material as the belt body 1, particularly is composed of a number of cords twisted together to form a round or square elongation, each cord comprising a number of heat-resistant fibers 5a, 5b, 5c . . . impregnated with a fluoroplastic material and twisted together. FIG. 2B show only 3 cords for the sake of simplification in the drawing, but the guide member, in fact, is composed of many cords as shown in the end view of FIG. 2A.

Figure 1:
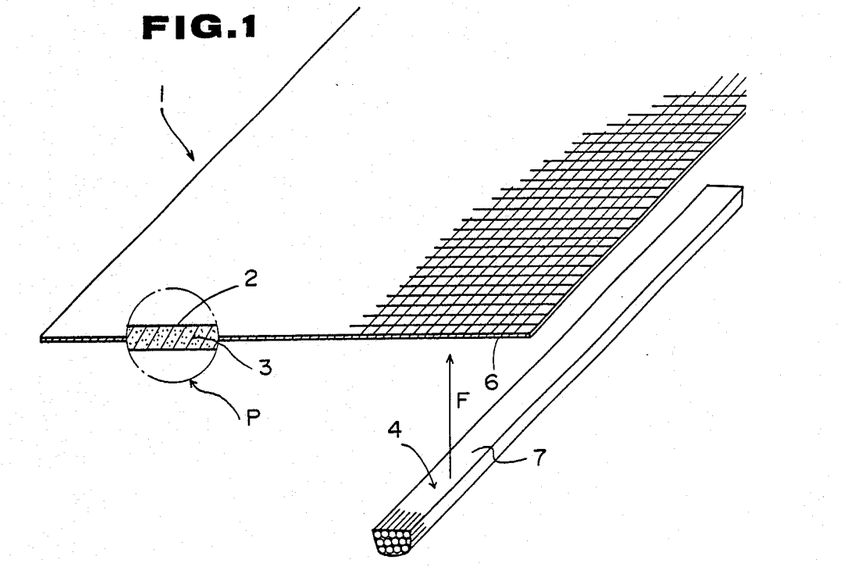
FIG. 1 is a perspective view of a belt body and a guide member, which is shown as being separate from the belt body.
Figure 3:
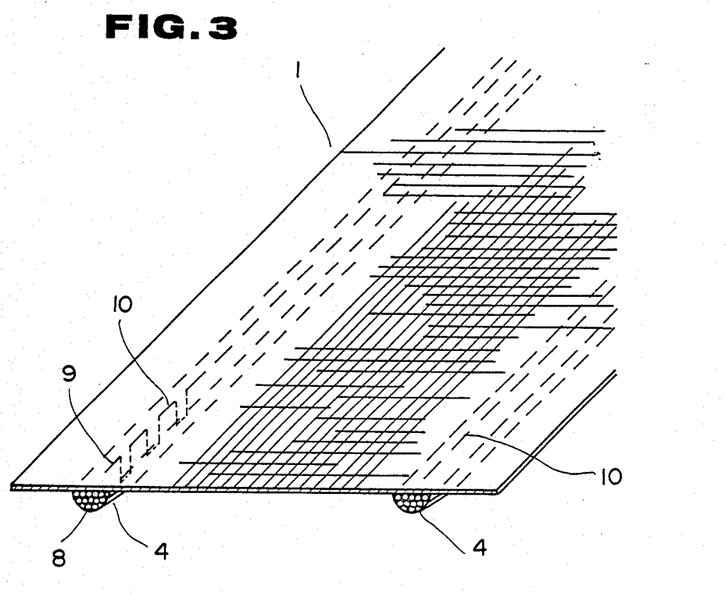
FIG. 3 is a perspective view of the anti-weaving conveyor belt with two guide members fixed to its back.
Figure 4:
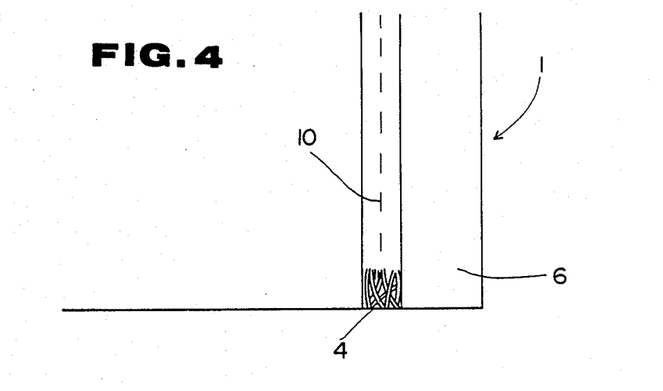
FIG. 4 is a back view of the anti-weaving conveyor belt.
Figure 5:
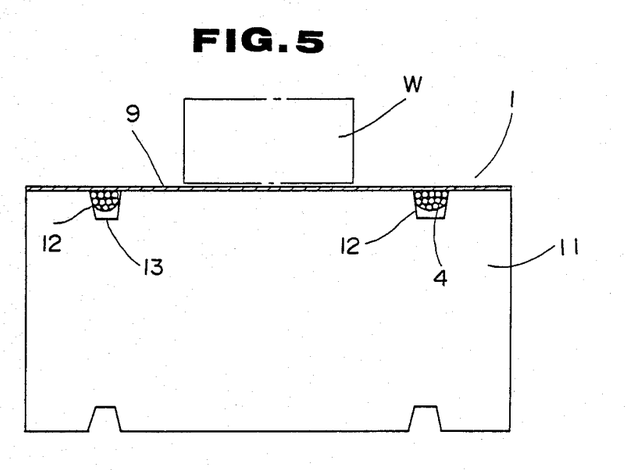
FIG. 5 shows how the conveyor belt is guided at each roll end.

As indicated by arrow F in FIG. 1, the guide elongation is applied and hot-welded to each longitudinal edge of the back 6 of the belt body 1. Thus, the upper surface 7 of the guide elongation 4 is tentatively attached to the back 6 of the belt body 1. As a matter of course, the guide elongations 4 extend straight in a longitudinal direction on the back of the belt body. Finally, the guide elongations 4 are sewed to the belt body 1 by stitches of heat resistant, fluoroplastic-impregnated strands 10 as shown in FIG. 3. The stitches appear on the upper surface 9 of the belt body. FIG. 4 shows the back of the belt with the guide elongations sewed to its opposite edges. FIG. 5 shows the belt conveyor with its opposite guide elongations 4 fitting in the tapered grooves 12 of one end roll 11. As shown in the drawing, the opposite sides of each guide member is put close to the inside walls of the groove, but the under surface of the guide member 4 is apart from the bottom 13 of the groove. An object to be transported is indicated at W.

As described above, the belt body 1 is made of a heat-resistant sheet 2 impregnated with a fluoroplastic material 3, and its guide members are made of the same material, specifically a number of stranded cords 5a, 5b, 5c . . . of the heat-resistant, fluoroplastic-impregnated material. Also, the strand with which the guide elongations are sewed to the belt body, is of the same heat-resistant, fluoroplastic-impregnated material. Therefore, the whole integration can be used in a high-temperature atmosphere, such as a calcinating furnace, an electric furnace, etc. The fluoroplastic has good mold release characteristics, but it has poor bond properties. Therefore instead of using an adhesive the belt body and the guide elongations are integrated by sewing together by stitches to guarantee free of separation of the guide elongations from the belt body. The guide elongations are sewed to the belt body by stitching with strand 10 vertically, that is traversing between the bottom of the guide elongation and the upper surface of the belt sheet, and therefore no strand 10 appears on each side of the guide elongation, thus causing no adverse effect on the smooth move along the opposite side walls of the groove of the roll.

The use of stranded cords has an effect to reduce local stressing of the guide elongation to possible minimum and assure the guide elongation of even distribution of stress.

A part of every cord comes close to the bottom of the groove of the roll, and another part goes apart from the bottom of the groove of the roll. The former or inside part of the cord is curved largely and stressed more than the latter or outside part. Every cord, however, has the substantially same resultant stress, and therefore, the guide member composed of a number of cords twisted together will be free from local stress or distortion which would have an adverse effect on the passing of the stranded cords through the groove of the roll.

Figure 6:
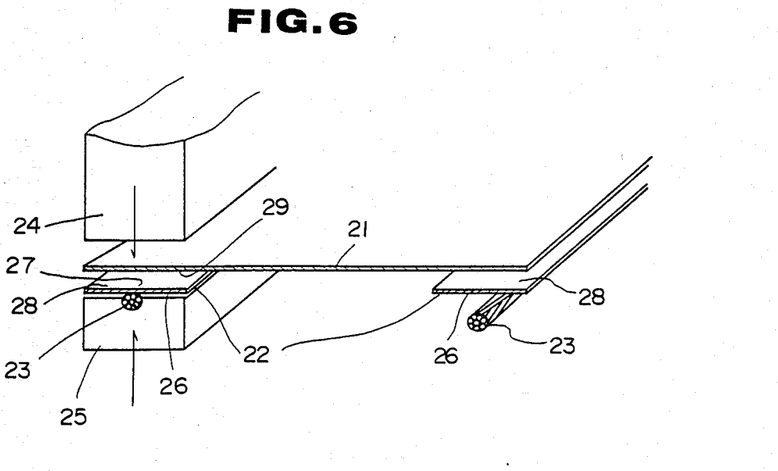
FIG. 6 shows how the anti-weaving conveyor belt is made.
Figure 7:
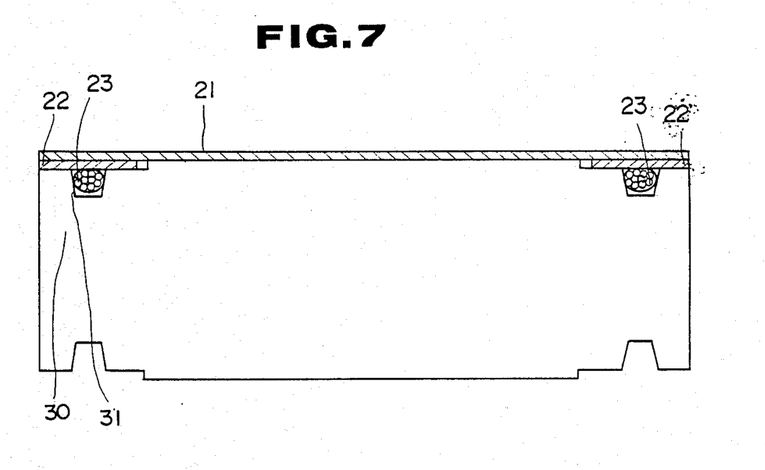
FIG. 7 shows the anti-weaving conveyor belt with its guide members fitting in the grooves of the rolls.
Figure 8:
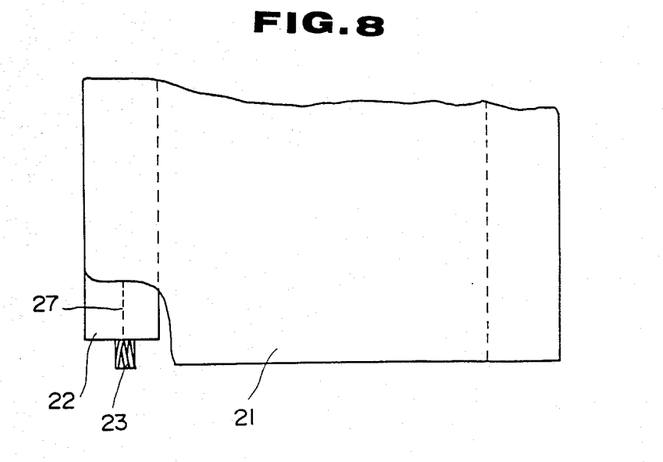
FIG. 8 is a plane view of the anti-weaving conveyor belt, partly broken.

FIGS. 6, 7 and 8 show still another embodiment of the present invention. The anti-weaving conveyor belt is shown as comprising a belt body 21 which is made of a heat-resistant sheet impregnated with a fluoroplastic, and guide members 23 which is consisted of a number of cords twisted together to form a round elongation, each cord comprising a number of heat-resistant, fluoroplastic-impregnated fibers twisted together. Also, heat-melting metal pads 24, 25 are shown.

Glass fiber and aramid resin can be used as a heat-resistant sheet material, and examples of a fluoroplastic are polytetrafluoroethylene (PTFE), polychlorotrifluoroethylene (PCTFE) etc.

In this particular example the opposite longitudinal edges of the belt body 21 are lined with reinforcement strips 22. At first, a guide elongation 23 is hot-welded and tentatively fixed to the back of each strip 22, and then the guide elongation is sewed to the back of each strip 22 by stitches 27 of heat-resistant, fluoroplastic-impregnated strands. Then, the stitches 27 appear on the upper surface 28 of the strip 22. Finally, the surfaces 28 of the reinforcements strips 22 are hot-welded to the back 29 of the belt body 21 by using the metal pads 24 and 25. Thus, the guide elongations 23 are integrally connected to the belt body 21 which is of a material of good releasability. No stitches 27 appear on the surface of the belt. Therefore, there is no fear for catching things while being transported by the belt. Stitches cannot be loosened, either. The double-layer construction along each longitudinal edge has an effect to increase strength.

Figure 9:
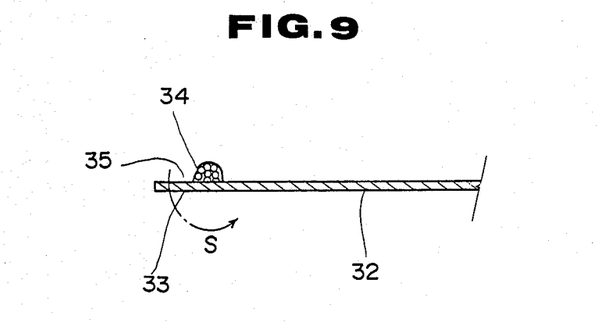
FIG. 9 shows the belt body prior to folding its opposite edges on its back.
Figure 10:
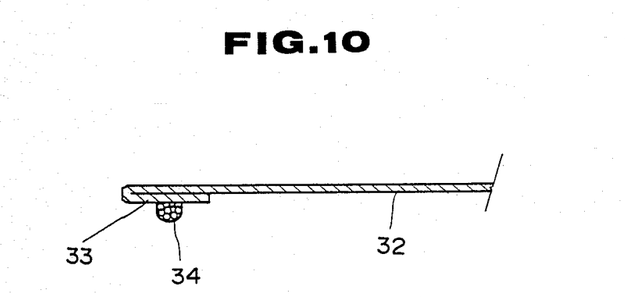
FIG. 10 shows the belt body with its opposite edges folded and hot-welded on its back.

Still another embodiment of the present invention is described below by referring to FIGS. 9 and 10.

The anti-weaving conveyor belt is shown as comprising a belt body 32, longitudinal edge portions 33 to be folded on the back of the belt body 32, and guide members 34 which are fixed to the longitudinal edge portions of the belt in the same way as described above. As indicated by arrow S, the longitudinal edge portions of the belt are folded on the back of the belt.

Figure 11:
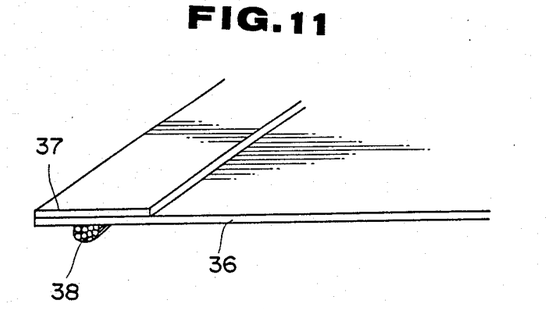
FIG. 11 is a perspective view of the anti-weaving conveyor belt.
Figure 12:
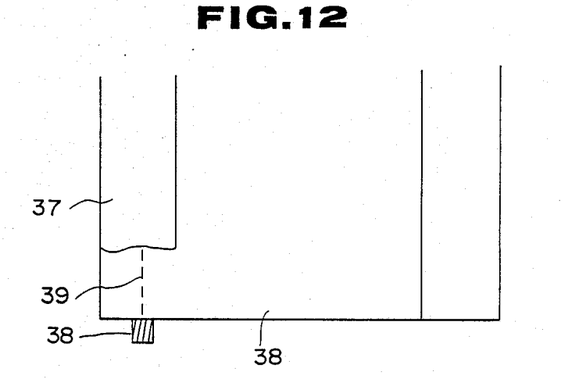
FIG. 12 is a plane view of the anti-weaving conveyor belt, partly broken.

Still another embodiment of the present invention is shown in FIGS. 11 and 12. The anti-weaving conveyor belt is shown as comprising a belt body 36, reinforcement strips 37 and guide members 38. In this case no stitches 39 appear on the surface.

Figure 13:
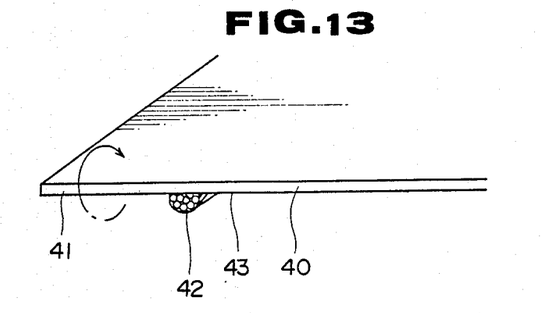
FIG. 13 is a perspective view of the anti-weaving conveyor belt showing the belt body prior to folding its opposite edges on its upper surface.
Figure 14:
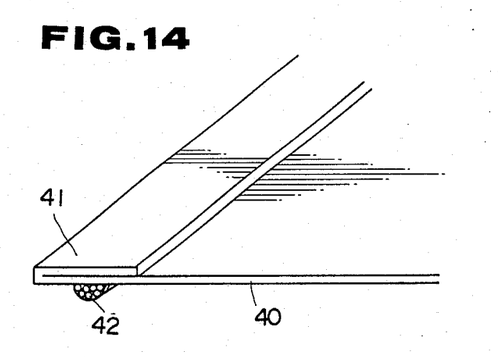
FIG. 14 shows the belt body with its opposite edges folded and hot-welded on its upper surface.

Still another embodiment of the present invention is shown in FIGS. 13 and 14. The anti-weaving conveyor belt is shown as comprising a belt body 40, folded edges 41 and guide member 42. The guide members 42 are sewed to the back 43 of the belt 40 by stitches, and then the longitudinal edges 41 are folded on the upper surface of the belt 40 to cover the stitches below.

Figure 15:
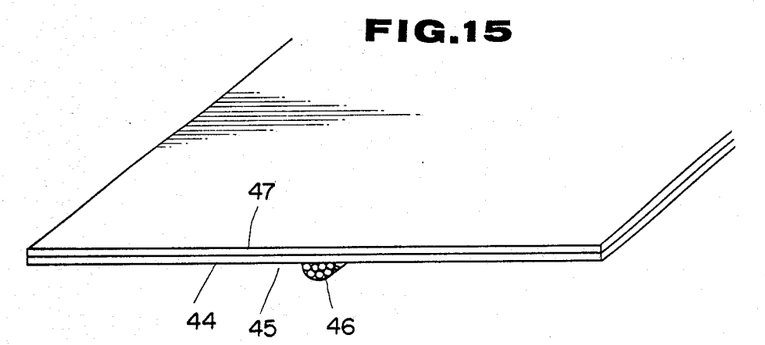
FIGS. 15 and 16 show different modifications.

As shown in FIG. 15, a single guide elongation 46 is sewed to the back 45 of an underlying belt sheet, and an overlying belt sheet which is as wide as the underlying belt sheet, is hot-melted and integrally connected to the underlying belt sheet.

Figure 16:
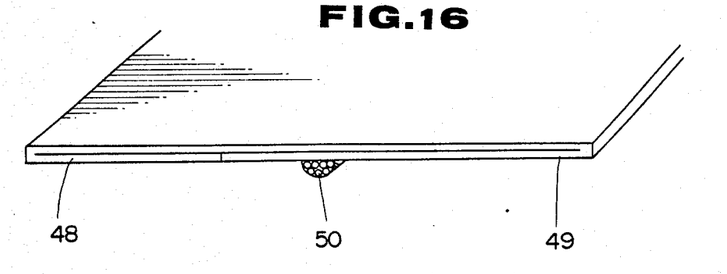

As shown in FIG. 16, a sheet twice as wide as the belt body, may be folded on itself after sewing a single guide elongation 50 to one half of the sheet, and then the folded sheet halves are hot-melted and integrated.

I claim:

1. An anti-weaving conveyor belt comprising a belt body which is composed of a heat-resistant, fluoroplastic-impregnated and calcinated sheet and a guide means fixed to the belt body in its longitudinal direction, characterized in that said guide means comprises a number of cords twisted together to form a round or square elongation, each cord comprising a number of heat-resistant, fluoroplastic-impregnated and calcinated fibers twisted together, said round or square elongation being joined to the back of said belt body by stitches of heat-resistant, fluoroplastic-impregnated and calcinated strands.

2. An anti-weaving conveyor belt according to claim 1 wherein said round or square elongation being hot-pressed and welded and tentatively held to the back of said belt body, and then joined to the back of said belt body by said stitches of heat-resistant, fluoroplastic-impregnated and calcinated strands.

3. An anti-weaving conveyor belt according to claim 1 or 2 wherein said belt body has an upper band and lower strips melted and attached as reinforcement to the back of the upper band along its opposite longitudinal edges, said round or square elongation being joined to each of said lower strips by said stitches of heat-resistant, fluoroplastic-impregnated and calcinated strands, thereby concealing the stitches below said upper band.

4. An anti-weaving conveyor belt according to claim 3 wherein said lower strips being parts of the longitudinal edges of said upper band folded on the back of said upper band.

5. An anti-weaving conveyor belt according to claim 1 wherein said belt body has a lower band and upper strips melted and attached as reinforcement to the upper surface of the lower band along its opposite longitudinal edges, said round or square elongation being joined to the lower surface of said lower band below each of said upper strips by said stitches of heat-resistant, fluoroplastic-impregnated and calcinated strands, thereby concealing the stitches below said upper strips.

6. An anti-weaving conveyor belt according to claim 5 wherein said upper strips being the longitudinal edges of said lower band folded on the upper surface of said lower band.

* * * * *